(12) United States Patent
Lu et al.

(10) Patent No.: US 11,400,690 B2
(45) Date of Patent: Aug. 2, 2022

(54) HIGH PERFORMANCE PRESS-HARDENED STEEL ASSEMBLY

(71) Applicant: GM GLOBAL TECHNOLOGY OPERATIONS LLC, Detroit, MI (US)

(72) Inventors: Qi Lu, Shanghai (CN); Jianfeng Wang, Nanjing (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 17/128,631

(22) Filed: Dec. 21, 2020

(65) Prior Publication Data

US 2021/0187906 A1 Jun. 24, 2021

(30) Foreign Application Priority Data

Dec. 24, 2019 (CN) .......................... 201911346019.0

(51) Int. Cl.
*B32B 15/01* (2006.01)
*C21D 9/46* (2006.01)
(Continued)

(52) U.S. Cl.
CPC ............ *B32B 15/011* (2013.01); *B21D 22/02* (2013.01); *B23K 20/04* (2013.01); *B32B 15/012* (2013.01);
(Continued)

(58) Field of Classification Search
None
See application file for complete search history.

(56) References Cited

U.S. PATENT DOCUMENTS

| 6,296,805 B1 | 10/2001 | Laurent et al. |
| 8,252,125 B2 | 8/2012 | Giefers et al. |

(Continued)

FOREIGN PATENT DOCUMENTS

| CN | 105792979 A | 7/2016 |
| CN | 106466697 A | 3/2017 |

(Continued)

OTHER PUBLICATIONS

Anonymous, "Process to improve oxidation resistance of press hardening steels," Research Disclosure, Database No. 641010 (Published online: Jul. 28, 2017), 2 pages.

(Continued)

*Primary Examiner* — Daniel J. Schleis
(74) *Attorney, Agent, or Firm* — Harness, Dickey & Pierce, P.L.C.

(57) ABSTRACT

A press-hardened steel assembly after hot stamping/hot forming including a core layer having a tensile strength of ≥about 1,800 megapascals to ≤about 2,200 megapascals and ≥about 90 volume % martensite, the core layer having a first thickness ≥about 40% to ≤about 96% of the thickness of the press-hardened steel assembly; and a first surface layer along a first surface of the core, the first surface layer having a tensile strength of ≥about 800 megapascals to ≤about 1,200 megapascals and ≥about 90 volume % martensite and bainite. The press-hardened steel assembly has a tensile strength of ≥about 1,600 megapascals to ≤about 2,000 megapascals and a VDA 238-100 bending angle of ≥about 50° to ≤about 80°.

19 Claims, 4 Drawing Sheets

(51) Int. Cl.
*C21D 6/00* (2006.01)
*B23K 20/04* (2006.01)
*B21D 22/02* (2006.01)
*B23K 103/04* (2006.01)

(52) U.S. Cl.
CPC .............. *C21D 6/004* (2013.01); *C21D 6/005* (2013.01); *C21D 6/008* (2013.01); *C21D 9/46* (2013.01); *B23K 2103/04* (2018.08); *C21D 2211/008* (2013.01)

(56) References Cited

U.S. PATENT DOCUMENTS

| | | | |
|---|---|---|---|
| 8,440,323 | B2 | 5/2013 | Spehner et al. |
| 8,614,008 | B2 | 12/2013 | Canourgues et al. |
| 8,733,142 | B2 | 5/2014 | Spehner et al. |
| 8,932,416 | B2 | 1/2015 | Nakanishi et al. |
| 8,992,697 | B2 | 3/2015 | Matsuda et al. |
| 9,182,196 | B2 * | 11/2015 | Stefansson ............. B23K 20/04 |
| 9,359,663 | B2 | 6/2016 | Mizuta et al. |
| 9,475,113 | B2 | 10/2016 | Naitou et al. |
| 9,611,518 | B2 | 4/2017 | Naitou et al. |
| 9,644,247 | B2 | 5/2017 | Matsuda et al. |
| 9,850,554 | B2 | 12/2017 | Naitou et al. |
| 10,029,294 | B2 | 7/2018 | Yamano et al. |
| 10,260,121 | B2 | 4/2019 | Lu et al. |
| 10,385,415 | B2 | 8/2019 | Wang et al. |
| 10,858,715 | B2 * | 12/2020 | Stefansson ............... C21D 1/18 |
| 2016/0145731 | A1 | 5/2016 | Sachdev et al. |
| 2017/0247071 | A1 | 8/2017 | Schneider et al. |
| 2017/0314088 | A1 | 11/2017 | Wang |
| 2018/0119245 | A1 | 5/2018 | Roubidoux et al. |
| 2018/0202017 | A1 * | 7/2018 | Drillet ................... B23K 26/21 |
| 2019/0176436 | A1 | 6/2019 | Pieronek |
| 2019/0389178 | A1 * | 12/2019 | Becker ................... C22C 38/24 |
| 2020/0157665 | A1 | 5/2020 | Lu et al. |
| 2020/0190611 | A1 | 6/2020 | Lu et al. |
| 2021/0189531 | A1 | 6/2021 | Lu et al. |

FOREIGN PATENT DOCUMENTS

| | | |
|---|---|---|
| CN | 107074292 A | 8/2017 |
| CN | 109562637 A | 4/2019 |
| CN | 109804098 A | 5/2019 |
| CN | 110144443 A | 8/2019 |
| CN | 110144444 A | 8/2019 |
| CN | 111197145 A | 5/2020 |
| CN | 111332367 A | 6/2020 |
| CN | 113025876 A1 | 6/2021 |
| DE | 102020131989 A1 | 6/2021 |
| IN | 201917011493 A | 7/2019 |
| WO | 2016106621 A1 | 7/2016 |
| WO | 2018107446 A1 | 6/2018 |
| WO | 2019127240 A1 | 7/2019 |
| WO | 2019222950 A1 | 11/2019 |
| WO | 2019241902 A1 | 12/2019 |

OTHER PUBLICATIONS

First Office Action for Chinese Patent Application No. 201911346019.0 dated Jan. 13, 2022, with correspondence dated Jan. 18, 2022, from China Patent Agent (H.K.) Ltd. summarizing contents; 10 pages.

* cited by examiner

HIGH PERFORMANCE PRESS-HARDENED STEEL ASSEMBLY

CROSS-REFERENCE TO RELATED APPLICATIONS

This application claims the benefit and priority of Chinese Patent Application No. 201911346019.0 filed Dec. 24, 2019. The entire disclosure of the above application is incorporated herein by reference.

INTRODUCTION

This section provides background information related to the present disclosure which is not necessarily prior art.

Press-hardened steel (PHS), also referred to as "hot-stamped steel" or "hot-formed steel," is one of the strongest steels used for automotive body structural applications. In certain applications, PHS may have tensile strength properties of about 1,500 megapascal (MPa). Such steel has desirable properties, including forming steel components with significant increases in strength-to-weight ratios. PHS components have become ever more prevalent in various industries and applications, including general manufacturing, construction equipment, automotive or other transportation industries, home or industrial structures, and the like. For example, when manufacturing vehicles, especially automobiles, continual improvement in fuel efficiency and performance is desirable; therefore, PHS components have been increasingly used. PHS components are often used for forming load-bearing components, like door beams, which usually require high strength materials. Thus, the finished state of these steels are designed to have high strength and enough ductility to resist external forces, such as, for example, resisting intrusion into the passenger compartment without fracturing so as to provide protection to the occupants. Moreover, galvanized PHS components may provide cathodic protection.

Many PHS processes involve austenitization of a sheet steel blank in a furnace, immediately followed by pressing and quenching of the sheet in dies. Austenitization is typically conducted in the range of about 880° C. to 950° C. PHS processes may be indirect or direct. In the direct method, the PHS component is formed and pressed simultaneously between dies, which quenches the steel. In the indirect method, the PHS component is cold-formed to an intermediate partial shape before austenitization and the subsequent pressing and quenching steps. The quenching of the PHS component hardens the component by transforming the microstructure from austenite to martensite. An oxide layer often forms during the transfer from the furnace to the dies. Therefore, after quenching, the oxide must be removed from the PHS component and the dies. The oxide is typically removed, i.e., descaled, by shot blasting.

The PHS component may be made from bare or aluminum-silicon (Al—Si) alloy using the direct method or from zinc-coated PHS using the direct method or indirect method. Coating the PHS component provides a protective layer (e.g., galvanic protection) to the underlying steel component. Zinc coatings offer cathodic protection; the coating acts as a sacrificial layer and corrodes instead of the steel component, even where the steel is exposed. Such coatings also generate oxides on the PHS components' surfaces, which are removed by shot blasting. Accordingly, alloy compositions that do not require coatings or other treatments are desired.

The PHS component may generally exhibit either high strength or high toughness. As strength increases, generally toughness decreases and vice versa. However, in order to reduce weight a high strength PHS component with high toughness is desired.

SUMMARY

This section provides a general summary of the disclosure, and is not a comprehensive disclosure of its full scope or all of its features.

In various aspects, the present technology provides a press-hardened steel assembly after hot stamping/hot forming including a core layer including a first steel sheet having an ultimate tensile strength of greater than or equal to about 1,800 megapascals to less than or equal to about 2,200 megapascals and greater than or equal to 90 volume % martensite, the core layer having a first thickness of greater than or equal to about 40% of a total thickness of the press-hardened steel to less than or equal to about 96% of the thickness of the press-hardened steel assembly; and a first surface layer disposed along a first surface of the core, wherein the first surface layer includes a second steel sheet having an ultimate tensile strength of greater than or equal to about 800 megapascals to less than or equal to about 1,200 megapascals and greater than or equal to 90 volume % martensite and bainite, wherein the press-hardened steel assembly has an ultimate tensile strength of greater than or equal to about 1,600 megapascals to less than or equal to about 2,000 megapascals and a VDA 238-100 bending angle of greater than or equal to about 50° to less than or equal to about 80°.

In one aspect, the first surface layer has a second thickness that is greater than or equal to about 2% of the total thickness of the press-hardened steel assembly to less than or equal to about 60% of the total thickness of the press-hardened steel assembly.

In one aspect, the press-hardened steel assembly further includes a second surface layer disposed along a second surface of the core opposite to the first surface, wherein the second surface layer includes a third steel sheet having an ultimate tensile strength of greater than or equal to about 800 megapascals to less than or equal to about 1,200 megapascals and greater than or equal to 90 volume % martensite and bainite.

In one aspect, the first surface layer has a second thickness that is greater than or equal to about 2% of the total thickness of the press-hardened steel assembly to less than or equal to about 30% of the total thickness of the press-hardened steel assembly and the second surface layer has a third thickness that is greater than or equal to about 2% of the total thickness of the press-hardened steel assembly to less than or equal to about 30% of the total thickness of the press-hardened steel assembly.

In one aspect, the first steel sheet has a VDA 238-100 bending angle of greater than or equal to about 70° to less than or equal to about 80° and the second steel sheet has a VDA 238-100 bending angle of less than or equal to about 45°.

In one aspect, the first steel sheet includes less than or equal to about 10 vol. % of one or more phases selected from the group consisting of: austenite, ferrite, and combinations thereof; and the second steel sheet includes less than or equal to about 10 vol. % of one or more phases selected from the group consisting of: austenite, ferrite, and combinations thereof.

In one aspect, the press-hardened steel is an architectural steel formed by a roll bonding process or a cladding process.

In one aspect, at least one of first steel sheet and the second steel sheet includes a coating comprising zinc (Zn), aluminum (Al), silicon (Si), and combinations thereof.

In one aspect, the press-hardened steel assembly is free of any applied surface coatings.

In various aspects, the present technology provides a press-hardened steel assembly after hot stamping/hot forming including a core layer including a first steel sheet having an ultimate tensile strength of greater than or equal to about 1,800 megapascals to less than or equal to about 2,200 megapascals and greater than or equal to 90 volume % martensite, the core layer having a first thickness of greater than or equal to about 40% of a total thickness of the press-hardened steel to less than or equal to about 96% of the thickness of the press-hardened steel assembly; and a first surface layer disposed along a first surface of the core, wherein the first surface layer includes a second steel sheet having an ultimate tensile strength of greater than or equal to about 800 megapascals (MPa) to less than or equal to about 1,200 megapascals and greater than or equal to 90 volume % martensite and bainite, the first surface layer being greater than or equal to about 2% of a thickness of the press-hardened steel to less than or equal to about 60% of the thickness of the press-hardened steel, wherein the first steel sheet includes an alloy composition includes carbon (C) at a concentration of greater than or equal to about 0.01 wt. % to less than or equal to about 0.2 wt. %, chromium (Cr) at a concentration of greater than or equal to about 0.01 wt. % to less than or equal to about 6 wt. %, manganese (Mn) at a concentration of greater than or equal to about 0.5 wt. % to less than or equal to about 4.5 wt. %, silicon (Si) at a concentration of greater than or equal to about 0.1 wt. % to less than or equal to about 2.5 wt. %, and a balance of the alloy composition being iron (Fe), and an alloy composition of the second steel sheet including carbon (C) at a concentration of greater than or equal to about 0.2 wt. % to less than or equal to about 0.45 wt. %, chromium (Cr) at a concentration of greater than or equal to about 0.01 wt. % to less than or equal to about 6 wt. %, manganese (Mn) at a concentration of greater than or equal to about 0 wt. % to less than or equal to about 3 wt. %, silicon (Si) at a concentration of greater than or equal to about 0.1 wt. % to less than or equal to about 2.5 wt. %, and a balance of the alloy composition being iron (Fe), wherein the press-hardened steel assembly has an ultimate tensile strength of greater than or equal to about 1,600 megapascals to less than or equal to about 2,000 megapascals and a VDA 238-100 bending angle of greater than or equal to about 50° to less than or equal to about 80°.

In one aspect, the press-hardened steel assembly further includes a second surface layer, the second surface layer including a third steel sheet having an ultimate tensile strength of greater than or equal to about 800 megapascals to less than or equal to about 1,200 megapascals and greater than or equal to 90 volume % martensite and bainite; wherein a second thickness of the first surface layer and a third thickness of the second surface layer each being independently greater than or equal to about 2% of the thickness of the press-hardened steel to less than or equal to about 30% of the thickness of the press-hardened steel assembly.

In one aspect, the first steel sheet includes less than or equal to about 10 vol. % of one or more phases selected from the group consisting of: austenite, ferrite, and combinations thereof; and the second steel sheet includes less than or equal to about 10 vol. % of one or more phases selected from the group consisting of: austenite, ferrite, and combinations thereof.

In one aspect, at least one of first steel sheet and the second steel sheet includes a coating comprising zinc (Zn), aluminum (Al), silicon (Si), and combinations thereof.

In one aspect, the press-hardened steel assembly is free of any applied surface coatings.

In various aspects, the present technology also provides a method of forming a press-hardened steel component; the method including selecting a blank of a steel alloy, the steel alloy being an architectural steel assembly including, a first surface layer, the first surface layer including a first steel sheet; a core layer, the core layer including a second steel sheet; and a second surface layer, the second surface layer including another first steel sheet; stamping the heated blank into a predetermined shape to form a stamped component; and quenching the stamped component at a constant rate to a temperature less than or equal to about a martensite finish (Mf) temperature of the steel alloy and greater than or equal to about room temperature to form the press-hardened steel component having a tensile strength of greater than or equal to about 1,600 megapascals to less than or equal to about 2,000 megapascals and a VDA 238-100 bending angle of greater than or equal to about 50° to less than or equal to about 80°, the first steel sheet having a strength of greater than or equal to 800 megapascals to less than or equal to 1200 megapascals, the first surface layer being greater than or equal to 2% of a thickness of the blank to less than or equal to 30% of the thickness of the stamped component, the second steel sheet having a strength of greater than or equal to 1800 megapascals to less than or equal to 2200 megapascals, the core layer being greater than or equal to 40% of the thickness of the blank to less than or equal to 96% of the thickness of the stamped component, and the second surface layer being greater than or equal to 2% of the thickness of the blank to less than or equal to 30% of the thickness of the stamped component.

In one aspect, the method does not include a descaling step, and the architectural steel does not include a layer of zinc (Zn) or an aluminum-silicon (Al—Si) coating.

In one aspect, the method further includes a descaling step, and the architectural steel includes a layer of zinc (Zn) or an aluminum-silicon (Al—Si) coating.

In one aspect, the press-hardened steel is an architectural steel formed by a roll bonding process, the roll bonding process including passing the first and second surface, and core layers through rollers under sufficient pressure to bond the layers, and welding the edges of the first and second surface, and core layers together.

In one aspect, the quenching includes decreasing the temperature of the stamped object at a rate of greater than or equal to about 15° C./s until the stamped object reaches a temperature below a martensite finish (Mf) temperature of the steel alloy.

Further areas of applicability will become apparent from the description provided herein. The description and specific examples in this summary are intended for purposes of illustration only and are not intended to limit the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
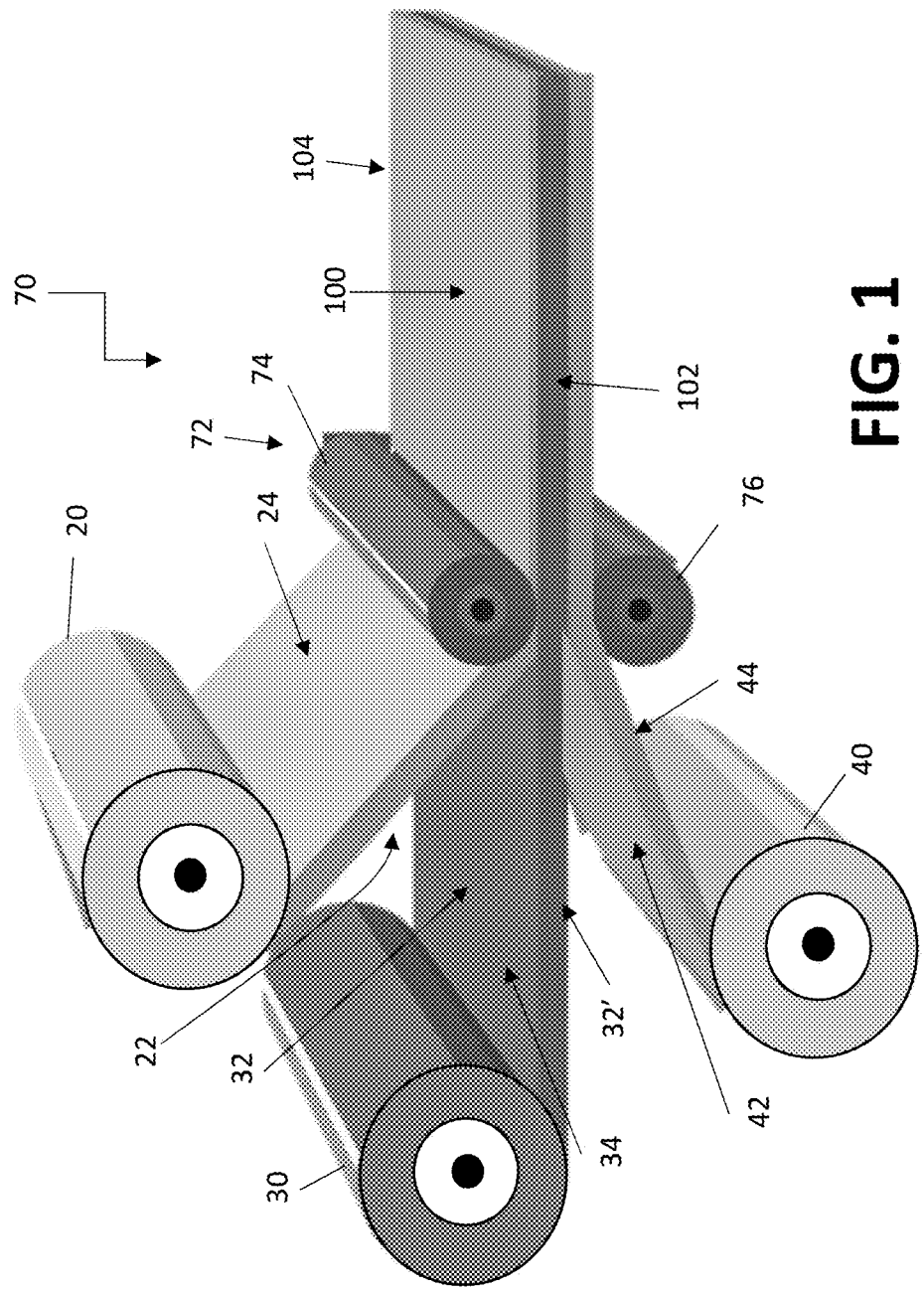
FIG. 1 is an illustration showing a method of making a steel assembly structure according to various aspects of the current technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and subranges given for the ranges.

Example embodiments will now be described more fully with reference to the accompanying drawings.

As discussed above, there are certain disadvantages associated with descaling press-hardened steels and coating press-hardened steels. Accordingly, the current technology provides a steel alloy that is configured to be hot stamped into a press-hardened component having a predetermined shape with or without coatings. Moreover, it is desirable to have a press-hardened steel component that concurrently exhibits high strength levels and high toughness levels, which previously were mutually exclusive properties in steel alloys used to form press-hardened components. In various aspects, the steel alloys are subjected to a hot forming process, for example, a press hardening process to form a press-hardened component. These press-hardened components may have good strength levels, for example, an ultimate tensile strength of greater than or equal to about 1,600 MPa to less than or equal to about 2,000 MPa, while also exhibiting high toughness levels. As will be described in greater detail below, high toughness can be expressed by bending angle of the component.

The press-hardened steel components formed in accordance with certain aspects of the present disclosure are particularly suitable for use in components of an automobile or other vehicles (e.g., motorcycles, boats, tractors, buses, motorcycles, mobile homes, campers, and tanks), but they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example. Non-limiting examples of automotive components include hoods, pillars (e.g., A-pillars, hinge pillars, B-pillars, C-pillars, and the like), panels, including structural panels, door panels, and door components, interior floors, floor pans, roofs, exterior surfaces, underbody shields, wheels, control arms and other suspension, crush cans, bumpers, structural rails and frames, cross car beams, undercarriage or drive train components, and the like.

With reference to FIG. 1, the current technology provides a method 70 of forming an architectural design of layered steel alloys to create an assembly that can be press-hardened in a hot forming process. More particularly, the architectural design includes layered sheets of distinct steel alloys that achieve higher strength and toughness values than was possible with components formed of a single sheet of steel alloy. In certain aspects, the press-hardened steel assembly includes a plurality of layers of steel sheets having distinct compositions. In certain aspects, the press-hardened steel assembly may be formed by roll cladding, but other suitable methods may be used as understood by those of skill in the art.

In some example embodiments of forming an architectural press-hardened steel, first coil 20, second coil 30, and third coil 40 of suitable sheet material formed of a steel alloy, as discussed below, are selected. First coil 20 has a facing side 22. The first coil 20 is unrolled to create a first sheet 24. Second coil 30 has two facing sides 32, 32'. The second coil 30 is unrolled to create a second sheet 34. Third coil 40 has a facing side 42. The third coil 40 is unrolled to create a third sheet 44. The first sheet 24, second sheet 34, and third sheet 44 are concurrently introduced into a rolling mill 72 having an upper roller 74 and a lower roller 76. The action of the upper roller 74 and lower roller 76 in the rolling mill 72 deforms first, second, and third sheets 24, 34, and 44 (from first coil 20, second coil 30, and third coil 40, respectively) to form a rolled sheet 100, which forms an assembly. After passing through the rolling mill 72, a total thickness of the rolled sheet 100 is less than a sum of individual thicknesses of each of the first, second, and third sheets 24, 34, and 44 prior to passing through the rolling mill 72. The rolled sheet 100 may combine first and second sheets 24, 34 at the interface of sides 22 and 32, and combine second and third sheets 34, 44 at the interface of sides 32' and 42. In this manner, the second sheet 34 may define a core region of the assembly defining the rolled sheet 100, while first, and third sheets 24, 44 may be considered to be surface layers sandwiching the core region.

Longitudinal edges 102 and 104 of rolled sheet 100 may be joined, fused, welded together. Welding the edges together may reduce or substantially prevent air ingress and movement of the sheets 24, 34, and 44 during subsequent processing. The rolled sheet 100 may undergo furnace heating which may produce a solid phase weld between the first, second, and third sheets 24, 34, and 44. Additionally, during a subsequent hot rolling processing, a solid phase weld may develop or grow between the first, second, and third sheets 24, 34, and 44.

The first and third sheets 24, 44 when combined in the rolled sheet 100 may each, independently, be greater than or equal to about 2% of the thickness of the rolled sheet 100 to less than or equal to about 30% of the thickness of the rolled sheet 100, optionally greater than or equal to about 2% of the thickness of the rolled sheet 100 to less than or equal to about 15% of the thickness of the rolled sheet 100, and in certain aspects, optionally greater than or equal to about 15% of the thickness of the rolled sheet 100 to less than or equal to about 30% of the thickness of the rolled sheet 100. For example, the sheets 24 and 44 may be, independently, 2% of the total thickness of the rolled sheet 100, optionally 4% of the thickness of the rolled sheet 100, optionally 6% of the thickness of the rolled sheet 100, optionally 8% of the thickness of the rolled sheet 100, optionally 10% of the thickness of the rolled sheet 100, optionally 12% of the thickness of the rolled sheet 100, optionally 14% of the thickness of the rolled sheet 100, optionally 16% of the thickness of the rolled sheet 100, optionally 18% of the thickness of the rolled sheet 100, 20% of the thickness of the rolled sheet 100, optionally 22% of the thickness of the rolled sheet 100, 24% of the thickness of the rolled sheet 100, optionally 26% of the thickness of the rolled sheet 100, optionally 28% of the thickness of the rolled sheet 100, or optionally 30% of the thickness of the rolled sheet 100. The thickness values may also be used to describe the relative thicknesses of the first and third sheet 24, 44 in the rolled sheet 100 after hot stamping, as described below.

The second sheet 34, when combined in the rolled sheet 100, that defines a core region of the assembly may be greater than or equal to about 40% of the total thickness of rolled sheet 100 to less than or equal to about 96% of the thickness of the rolled sheet 100, optionally 70% of the thickness of the press-hardened steel to less than or equal to about 96% of the thickness of the rolled sheet 100, or optionally 40% of the thickness of the press-hardened steel to less than or equal to about 70% of the thickness of the rolled sheet 100. For example, the sheet 34 may be 40% of the rolled sheet 100, optionally 42% of the rolled sheet 100, 44% of the rolled sheet 100, optionally 46% of the rolled sheet 100, optionally 48% of the rolled sheet 100, optionally 50% of the rolled sheet 100, optionally 52% of the rolled sheet 100, optionally 54% of the rolled sheet 100, optionally 56% of the rolled sheet 100, optionally 58% of the rolled sheet 100, optionally 60% of the rolled sheet 100, optionally 62% of the rolled sheet 100, optionally 64% of the rolled sheet 100, optionally 66% of the rolled sheet 100, optionally 68% of the rolled sheet 100, optionally 70% of the rolled sheet 100, optionally 72% of the rolled sheet 100, optionally 74% of the rolled sheet 100, optionally 75% of the rolled sheet 100, optionally 76% of the rolled sheet 100, optionally 78% of the rolled sheet 100, optionally 80% of the rolled sheet 100, optionally 82% of the rolled sheet 100, optionally 84% of the rolled sheet 100, optionally 86% of the rolled sheet 100, optionally 88% of the rolled sheet 100, optionally 90% of the rolled sheet 100, optionally 92% of the rolled sheet 100, optionally 94% of the rolled sheet 100, or optionally 96% of the rolled sheet 100. The thickness values may also be used to describe the relative thicknesses of the second sheet 34 in the rolled sheet 100 after hot stamping, as described below.

In some example embodiments, only first coil 20 and second coil 30, or second coil 30 and third coil 40 are used in the forming of an architecture press-hardened steel. For example, first and second coils 20 and 30 may form rolled sheet 110, by combining first and second sheets 24 and 34 at the interfaces of side 22 and 32. For example, second coil 30 and third coil 40 may form rolled sheet 120 (not shown), by combining second and third sheets 34, 44 at the interfaces of sides 32' and 42.

Figure 2A:
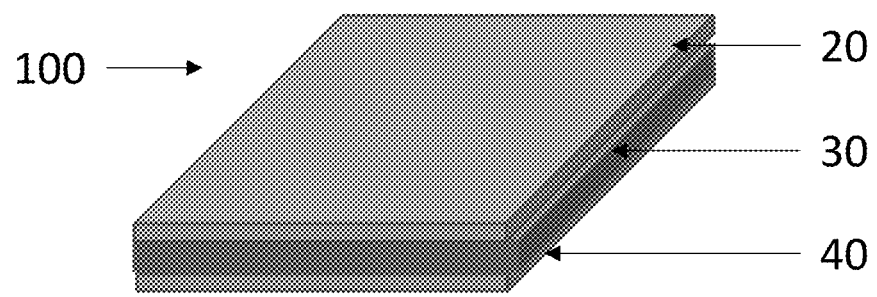
FIG. 2A is an illustration showing a steel assembly structure according to various aspects of the current technology.
Figure 2B:
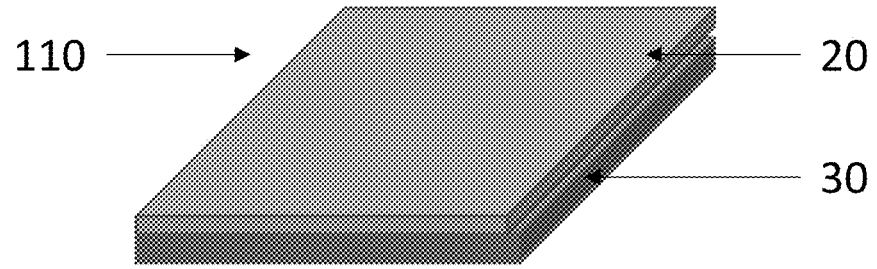
FIG. 2B is an illustration showing a steel assembly structure according to various aspects of the current technology.

With reference to FIGS. 2A and 2B, the current technology provides an architectural design of layered steel alloys. FIG. 2A provides an architectural design of layered steel alloys comprising two surface layers and a core layer, and FIG. 2B provides an architecture design of layered steel alloys comprising one surface layer and a core layer.

The first and third steel coils 20, 40 may be steel coils having the same alloy composition, for example, including a first steel alloy that has a relatively lower strength and high toughness. The second steel coil 30 may be a second steel coil including a second steel alloy composition that has a high strength, but relatively lower toughness. The rolled sheets 100, 110, and 120 may be hereinafter referred to as a steel architectural component or an assembly.

The C is present in the first steel alloy at a concentration of greater than or equal to about 0.01 wt. % to less than or equal to about 0.2 wt. % and subranges thereof. In certain aspects, the C is present at greater than or equal to about 0.01 wt. % to less than or equal to about 0.15 wt. %, optionally greater than or equal to about 0.02 wt. % to less than or equal to about 0.13 wt. %, optionally greater than or equal to about 0.05 wt. % to less than or equal to about 0.12 wt. %, and in certain variations, optionally greater than or equal to about 0.07 wt. % to less than or equal to about 0.10 wt. %. In certain example embodiments, the first steel alloy comprises C at a concentration of about 0.01 wt. %, about 0.02 wt. %, about 0.04 wt. %, about 0.06 wt. %, about 0.08 wt. %, about 0.09 wt. %, about 0.1 wt. %, about 0.11 wt. %, about 0.12 wt. %, about 0.14 wt. %, about 0.16 wt. %, about 0.18 wt. %, or about 0.2 wt. %. Weight percent (wt. %) or mass percent, is the weight of a component divided by the weight of the overall alloy composition multiplied by 100. For example, 3 pounds of C in a 100-pound sample of steel alloy would have a weight percent of 3.

The Cr is present in the first steel alloy at a concentration of greater than or equal to about 0.01 wt. % to less than or equal to about 6 wt. % and subranges thereof. In certain aspects, the Cr is present at greater than or equal to about 0.01 wt. % to less than or equal to about 5.5 wt. %, optionally greater than or equal to about 0.02 wt. % to less than or equal to about 5 wt. %, optionally greater than or equal to about 0.05 wt. % to less than or equal to about 4.5 wt. %, optionally greater than or equal to about 0.1 wt. % to less than or equal to about 4 wt. %, optionally greater than or equal to about 0.15 wt. % to less than or equal to about 3.5 wt. %, and in certain variations, optionally greater than or equal to about 0.2 wt. % to less than or equal to about 3 wt. %. In certain example embodiments, the first steel alloy comprises Cr at a concentration of about 0.01 wt. %, about 0.02 wt. %, about 0.04 wt. %, about 0.06 wt. %, about 0.08 wt. %, about 0.09 wt. %, about 0.1 wt. %, about 0.11 wt. %, about 0.12 wt. %, about 0.14 wt. %, about 0.16 wt. %, about 0.18 wt. %, about 0.2 wt. %, about 2.2 wt. %, about 2.4 wt. %, about 2.5 wt. %, about 2.6 wt. %, about 2.8 wt. %, about 3 wt. %, about 3.2 wt. %, about 3.4 wt. %, about 3.5 wt. %, about 3.6 wt. %, about 3.8 wt. %, about 4 wt. %, about 4.2 wt. %, about 4.4 wt. %, about 4.5 wt. %, about 4.6 wt. %, about 4.8 wt. %, about 5 wt. %, about 5.2 wt. %, about 5.4 wt. %, about 5.5 wt. %, about 5.6 wt. %, about 5.8 wt. %, or about 6 wt. %.

The Si is present in the first steel alloy at a concentration of greater than or equal to about 0.1 wt. % to less than or equal to about 2.5 wt. %, greater than or equal to about 0.5 wt. % to less than or equal to about 2.3 wt. %, or greater than or equal to about 1 wt. % to less than or equal to about 2 wt. %. In certain example embodiments, the first steel alloy comprises Si at a concentration of about 0.1 wt. %, about 0.2 wt. %, about 0.3 wt. %, about 0.4 wt. %, 0.5 wt. %, about 0.6 wt. %, about 0.7 wt. %, about 0.8 wt. %, about 0.9 wt. %, about 1 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2 wt. %, about 2.1 wt. %, about 2.2 wt. %, about 2.3 wt. %, about 2.4 wt. %, about 2.5 wt. %.

In certain example embodiments, the first steel alloy further comprises manganese (Mn) at a concentration of greater than or equal to about 0.5 wt. % to less than or equal to about 4.5 wt. %, greater than or equal to about 1 wt. % to less than or equal to about 3 wt. %, greater than or equal to about 1.5 wt. % to less than or equal to about 2.5 wt. %. In certain example embodiments, the first steel alloy comprises Mn at a concentration of less than or equal to about 4.5 wt. %, less than or equal to about 4 wt. %, less than or equal to about 3.5 wt. %, less than or equal to about 3 wt. %, less than or equal to about 2.5 wt. %, or less than or equal to about 2 wt. %, less than or equal to about 1.5 wt. %, less than or equal to about 1 wt. %, less than or equal to about 0.5 wt. %, such as at a concentration of about 4.5 wt. %, about 4.4 wt. %, about 4.2 wt. %, about 4 wt. %, about 3.8 wt. %, about 3.6 wt. %, about 3.4 wt. %, about 3.2 wt. %, about 3 wt. %, about 2.8 wt. %, about 2.6 wt. %, about 2.4 wt. %, about 2.2 wt. %, about 2 wt. %, about 1.8 wt. %, about 1.6 wt. %, about 1.4 wt. %, about 1.2 wt. %, about 1 wt. %, about 0.8 wt. %, about 0.6 wt. %, or about 0.5 wt. %.

As described further below, other alloying components may be present in the first steel alloy composition. Further, the alloy may comprise a cumulative amount of impurities and contaminants at less than or equal to about 0.1 wt. % of the total alloy composition, optionally less than or equal to about 0.05 wt. %, and in certain variations, less than or equal to about 0.01 wt. %.

The Fe makes up the balance of the first steel alloy.

In certain example embodiments, the first steel alloy further comprises nitrogen (N) at a concentration of greater than or equal to about 0 wt. % to less than or equal to about 0.008 wt. % or greater than or equal to about 0.0001 wt. % to less than or equal to about 0.008 wt. %. In some example embodiments, the steel alloy is substantially free of N. As used herein, "substantially free" refers to trace component levels, such as levels of less than or equal to about 0.0001 wt. %, or levels that are not detectable.

In certain example embodiments, the first steel alloy further comprises molybdenum (Mo) at a concentration of greater than or equal to about 0 wt. % to less than or equal to about 0.8 wt. %, greater than or equal to about 0.01 wt. % to less than or equal to about 0.8 wt. %, or less than or equal to about 0.8 wt. %. For example, in certain example embodiments, the first steel alloy is substantially free of Mo or comprises Mo at a concentration of less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, or less than or equal to about 0.1 wt. %, such as at a concentration of about 0.8 wt. %, about 0.7 wt. %, about 0.6 wt. %, about 0.5 wt. %, about 0.4 wt. %, about 0.3 wt. %, about 0.2 wt. %, about 0.1 wt. %, or lower. For example, in certain example embodiments, the first steel alloy is substantially free of Mo, for example, levels of less than or equal to about 0.0001 wt. % Mo or levels that are not detectable.

In certain example embodiments, the first steel alloy further comprises boron (B) at a concentration of greater than or equal to about 0 wt. % to less than or equal to about 0.005 wt. %, greater than or equal to about 0.0001 wt. % to less than or equal to about 0.005 wt. %, or less than or equal to about 0.005 wt. %. For example, in certain example embodiments, the first steel alloy is substantially free of B or comprises B at a concentration of less than or equal to about 0.005 wt. %, less than or equal to about 0.004 wt. %, less than or equal to about 0.003 wt. %, less than or equal to about 0.002 wt. %, or less than or equal to about 0.001 wt. %, such as at a concentration of about 0.005 wt. %, about 0.004 wt. %, about 0.003 wt. %, about 0.002 wt. %, about 0.001 wt. %, about 0.0005 wt. %, about 0.0001 wt. %, or lower. For example, in certain example embodiments, the steel alloy is substantially free of B, for example, levels of less than or equal to about 0.0001 wt. % B or levels that are not detectable.

In certain example embodiments, the first steel alloy further comprises niobium (Nb) at a concentration of greater than or equal to about 0 wt. % to less than or equal to about 0.8 wt. %, greater than or equal to about 0.01 wt. % to less than or equal to about 0.8 wt. %, or less than or equal to about 0.8 wt. %. For example, in certain example embodiments, the first steel alloy is substantially free of Nb or comprises Nb, at a concentration of less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, or less than or equal to about 0.1 wt. %, such as at a concentration of about 0.8 wt. %, about 0.7 wt. %, about 0.6 wt. %, about 0.5 wt. %, about 0.4 wt. %, about 0.3 wt. %, about 0.2 wt. %, about 0.1 wt. %, or lower. For example, in certain example embodiments, the first steel alloy is substantially free of Nb, for example, levels of less than or equal to about 0.0001 wt. % Nb or levels that are not detectable.

In certain example embodiments, the first steel alloy further comprises vanadium (V) at a concentration of greater than or equal to about 0 wt. % to less than or equal to about 0.8 wt. %, greater than or equal to about 0.01 wt. % to less than or equal to about 0.8 wt. %, or less than or equal to about 0.8 wt. %. For example, in certain example embodiments, the first steel alloy is substantially free of V or comprises V at a concentration of less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, or less than or equal to about 0.1 wt. %, such as at a concentration of about 0.8 wt. %, about 0.7 wt. %, about 0.6 wt. %, about 0.5 wt. %, about 0.4 wt. %, about 0.3 wt. %, about 0.2 wt. %, about 0.1 wt. %, or lower. For example, in certain example embodiments, the first steel alloy is substantially free of V, for example, levels of less than or equal to about 0.0001 wt. % V or levels that are not detectable.

In certain example embodiments, the first steel alloy further comprises nickel (Ni) at a concentration of greater than or equal to about 0 wt. % to less than or equal to about 5 wt. %, greater than or equal to about 1 wt. % to less than or equal to about 3 wt. %, greater than or equal to about 1.5 wt. % to less than or equal to about 2.5 wt. %. In certain example embodiments, the first steel alloy is substantially free of Ni or comprises Ni at a concentration of less than or equal to about 5 wt. %, less than or equal to about 4.5 wt. %, less than or equal to about 4 wt. %, less than or equal to about 3.5 wt. %, less than or equal to about 3 wt. %, less than or equal to about 2.5 wt. %, or less than or equal to about 2 wt. %, less than or equal to about 1.5 wt. %, less than or equal to about 1 wt. %, less than or equal to about 0.5 wt. %, such as at a concentration of about 5 wt. %, about 4.8 wt. %, about 4.6 wt. %, about 4.4 wt. %, about 4.2 wt. %, about 4 wt. %, about 3.8 wt. %, about 3.6 wt. %, about 3.4 wt. %, about 3.2 wt. %, about 3 wt. %, about 2.8 wt. %, about 2.6 wt. %, about 2.4 wt. %, about 2.2 wt. %, about 2 wt. %, about 1.8 wt. %, about 1.6 wt. %, about 1.4 wt. %, about 1.2 wt. %, about 1 wt. %, about 0.8 wt. %, about 0.6 wt. %, or about 0.5 wt. %. For example, in certain example embodiments, the steel alloy is substantially free of Ni, for example, levels of less than or equal to about 0.0001 wt. % Ni or levels that are not detectable.

The first steel alloy can include various combinations of C, Cr, Si, Mn, N, Ni, Mo, B, Nb, V, and Fe at their respective concentrations described above. In some embodiments, the first steel alloy consists essentially of C, Cr, Si, Mn, and Fe. As described above, the term "consists essentially of" means the steel alloy excludes additional compositions, materials, components, elements, and/or features that materially affect the basic and novel characteristics of the steel alloy, such as first the steel alloy may not require coatings or descaling when formed into a press-hardened steel component, but any compositions, materials, components, elements, and/or features that do not materially affect the basic and novel characteristics of the steel alloy can be included in the embodiment. Therefore, when the first steel alloy consists essentially of C, Cr, Si, Mn, and Fe, the first steel alloy can also include any combination of N, Ni, Mo, B, Nb, and V, as provided above, that does not materially affect the basic and novel characteristics of the first steel alloy. In other embodiments, the first steel alloy consists of C, Cr, Si, Mn, and Fe at their respective concentrations described above and at least one of N, Ni, Mo, B, Nb, and V at their respective concentrations described above. Other elements that are not described herein can also be included in trace amounts, i.e., amounts of less than or equal to about 1.5 wt. %, less than or equal to about 1 wt. %, less than or equal to about 0.5 wt. %, or amounts that are not detectable, provided that they do not materially affect the basic and novel characteristics of the first steel alloy.

In some example embodiments, the first steel alloy consists essentially of C, Cr, Si, Mn, and Fe. In some example embodiments, the first steel alloy consists of C, Cr, Si, Mn, and Fe.

In some example embodiments, the first steel alloy consists essentially of C, Cr, Si, Mn, Ni, and Fe. In some example embodiments, the first steel alloy consists of C, Cr, Si, Mn, Ni, and Fe.

In some example embodiments, the first steel alloy consists essentially of C, Cr, Si, Mn, Mo, and Fe. In some example embodiments, the first steel alloy consists of C, Cr, Si, Mn, Mo, and Fe.

In some example embodiments, the first steel alloy consists essentially of C, Cr, Si, Mn, Mo, Ni, and Fe. In some example embodiments, the first steel alloy consists of C, Cr, Si, Mn, Mo, Ni, and Fe.

In some example embodiments, the first steel alloy consists essentially of C, Cr, Si, Mn, Mo, Nb, V, and Fe. In some example embodiments, the first steel alloy consists of C, Cr, Si, Mn, Mo, Nb, V, and Fe.

In some example embodiments, the first steel alloy consists essentially of C, Cr, Si, Mn, Mo, Nb, V, Ni, and Fe. In some example embodiments, the first steel alloy consists of C, Cr, Si, Mn, Mo, Nb, V, Ni, and Fe.

In some example embodiments, the first steel alloy consists essentially of C, Cr, Si, Mn, Mo, Nb, and Fe. In some example embodiments, the first steel alloy consists of C, Cr, Si, Mn, Mo, Nb, and Fe.

In some example embodiments, the first steel alloy consists essentially of C, Cr, Si, Mn, Mo, Nb, Ni, and Fe. In some example embodiments, the first steel alloy consists of C, Cr, Si, Mn, Mo, Nb, Ni, and Fe.

In some example embodiments, the first steel alloy consists essentially of C, Cr, Si, Mn, N, and Fe. In some example embodiments, the first steel alloy consists of C, Cr, Si, Mn, N, and Fe.

In some example embodiments, the first steel alloy consists essentially of C, Cr, Si, Mn, N, Ni, and Fe. In some example embodiments, the first steel alloy consists of C, Cr, Si, Mn, N, Ni, and Fe.

In some example embodiments, the first steel alloy consists essentially of C, Cr, Si, Mn, N, Mo, B, Nb, V, and Fe. In some example embodiments, the first steel alloy consists of C, Cr, Si, Mn, N, Mo, B, Nb, V, and Fe.

In some example embodiments, the first steel alloy consists essentially of C, Cr, Si, Mn, N, Mo, B, Nb, V, Ni, and Fe. In some example embodiments, the first steel alloy consists of C, Cr, Si, Mn, N, Mo, B, Nb, V, Ni, and Fe.

In some example embodiments, the first steel alloy consists essentially of C, Cr, Si, and Fe. In some example embodiments, the first steel alloy consists of C, Cr, Si, and Fe.

In some example embodiments, the first steel alloy consists essentially of C, Cr, Si, Ni, and Fe. In some example embodiments, the first steel alloy consists of C, Cr, Si, Ni, and Fe.

In some example embodiments, the first steel alloy consists essentially of C, Cr, Si, Mo, B, Nb, V, and Fe. In some example embodiments, the first steel alloy consists of C, Cr, Si, Mo, B, Nb, V, and Fe.

In some example embodiments, the first steel alloy consists essentially of C, Cr, Si, Mo, B, Nb, V, Ni, and Fe. In some example embodiments, the first steel alloy consists of C, Cr, Si, Mo, B, Nb, V, Ni, and Fe.

Table 1 shows a composition of first steel alloy of an example embodiment.

TABLE 1

| Composition | Chemical Composition (wt. %) | | | | | |
| --- | --- | --- | --- | --- | --- | --- |
| | C | Mn | Cr | Si | Others | Fe |
| Range | 01-0.2 | 0.5-4.5 | 0.01-6 | 0.1-2.5 | N <0.008, Ni <5, Mo <0.8, B <0.005, Nb/V <0.8 | Balance |

Hardened steel (e.g., formed from the roll clad multilayered assembly and hot stamping process) made from the first steel alloy may have an ultimate tensile strength (UTS) of greater than or equal to about 800 MPa to less than or equal to about 1,200 MPa, greater than or equal to about 1,000 MPa to less than or equal to about 1,200 MPa, greater than or equal to about, 800 MPa to less than or equal to about 1,000 MPa, or about 1,000 MPa.

Also, the hardened steel (e.g., formed from the roll clad multilayered assembly and hot stamping process) made from the first steel alloy may have a VDA 238-100 bending angle $\alpha_t$ (°) of greater than or equal to about 70° to less than or equal to 80°, such as a VDA 238-100 bending angle of about 70°, about 72°, about 74°, about 76°, about 78°, or about 80°, in the hardened condition. The bending angle may be measured by a VDA bending angle procedure using the three-point bending device procedure described in the VDA 238-100 standard, the relevant portions of which are incorporated herein by reference. The standard specifies the test conditions, tooling, geometry and experimental settings as well as bendability limit assessment. The VDA 238-100 also specifies a method for calculating the bending angle $\alpha_t$.

Prior to processing, the first steel alloy may be in the form of a coil of the metal. As noted above, the first steel alloy may be free of any applied coating, or may have an applied coating. The applied coatings may include galvanic coatings, such as zinc-based coatings, or aluminum-silicon antioxidation coatings. In this form, the coil can be unrolled and cut into predetermined shapes or blanks.

The second steel alloy composition may be one that has a high strength, but relatively lower toughness. For example, the C is present in the second steel alloy at a concentration of greater than or equal to about 0.2 wt. % to less than or equal to about 0.45 wt. % and subranges thereof. In certain aspects, the C is present at greater than or equal to about 0.2 wt. % to less than or equal to about 0.4 wt. %, optionally greater than or equal to about 0.25 wt. % to less than or equal to about 0.35 wt. %, optionally greater than or equal to about 0.2 wt. % to less than or equal to about 0.35 wt. %, and in certain variations, optionally greater than or equal to about 0.3 wt. % to less than or equal to about 0.4 wt. %. In certain example embodiments, the second steel alloy comprises C at a concentration of about 0.2 wt. %, about 0.22 wt. %, about 0.24 wt. %, about 0.26 wt. %, about 0.28 wt. %, about 0.3 wt. %, about 0.32 wt. %, about 0.34 wt. %, about 0.36 wt. %, about 0.38 wt. %, about 0.4 wt. %, about 0.42 wt. %, about 0.44 wt. %, or about 0.45 wt. %.

The Cr is present in the second steel alloy at a concentration of greater than or equal to about 0.01 wt. % to less than or equal to about 6 wt. % and subranges thereof. In certain aspects, the Cr is present at greater than or equal to about 0.01 wt. % to less than or equal to about 5.5 wt. %, optionally greater than or equal to about 0.02 wt. % to less than or equal to about 5 wt. %, optionally greater than or equal to about 0.05 wt. % to less than or equal to about 4.5 wt. %, optionally greater than or equal to about 0.1 wt. % to less than or equal to about 4 wt. %, optionally greater than or equal to about 0.15 wt. % to less than or equal to about 3.5 wt. %, and in certain variations, optionally greater than or equal to about 0.2 wt. % to less than or equal to about 3 wt. %. In certain example embodiments, the second steel alloy comprises Cr at a concentration of about 0.01 wt. %, about 0.02 wt. %, about 0.04 wt. %, about 0.06 wt. %, about 0.08 wt. %, about 0.09 wt. %, about 0.1 wt. %, about 0.11 wt. %, about 0.12 wt. %, about 0.14 wt. %, about 0.16 wt. %, about 0.18 wt. %, about 0.2 wt. %, about 2.2 wt. %, about 2.4 wt. %, about 2.5 wt. %, about 2.6 wt. %, about 2.8 wt. %, about 3 wt. %, about 3.2 wt. %, about 3.4 wt. %, about 3.5 wt. %, about 3.6 wt. %, about 3.8 wt. %, about 4 wt. %, about 4.2 wt. %, about 4.4 wt. %, about 4.5 wt. %, about 4.6 wt. %, about 4.8 wt. %, about 5 wt. %, about 5.2 wt. %, about 5.4 wt. %, about 5.5 wt. %, about 5.6 wt. %, about 5.8 wt. %, about 6 wt. %.

The Si is present in the second steel alloy at a concentration of greater than or equal to about 0.1 wt. % to less than or equal to about 2.5 wt. %, greater than or equal to about 0.5 wt. % to less than or equal to about 2.3 wt. %, or greater than or equal to about 1 wt. % to less than or equal to about 2 wt. %. In certain example embodiments, the second steel alloy comprises Si at a concentration of about 0.1 wt. %, about 0.2 wt. %, about 0.3 wt. %, about 0.4 wt. %, 0.5 wt. %, about 0.6 wt. %, about 0.7 wt. %, about 0.8 wt. %, about 0.9 wt. %, about 1 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2 wt. %, about 2.1 wt. %, about 2.2 wt. %, about 2.3 wt. %, about 2.4 wt. %, about 2.5 wt. %.

In certain example embodiments, the second steel alloy further comprises manganese (Mn) at a concentration of greater than or equal to about 0 wt. % to less than or equal to about 3 wt. %, greater than or equal to about 0.5 wt. % to less than or equal to about 2.5 wt. %, or greater than or equal to about 1 wt. % to less than or equal to about 2 wt. %. In certain example embodiments, the second steel alloy comprises Mn at a concentration of less than or equal to about less than or equal to about 3 wt. %, less than or equal to about 2.5 wt. %, or less than or equal to about 2 wt. %, less than or equal to about 1.5 wt. %, less than or equal to about 1 wt. %, less than or equal to about 0.5 wt. %, such as at a concentration of about 2 wt. %, about 3 wt. %, about 2.8 wt. %, about 2.6 wt. %, about 2.4 wt. %, about 2.2 wt. %, about 2 wt. %, about 1.8 wt. %, about 1.6 wt. %, about 1.4 wt. %, about 1.2 wt. %, about 1 wt. %, about 0.8 wt. %, about 0.6 wt. %, about 0.5 wt. %, about 0.4 wt. %, about 0.2 wt. %, or about 0 wt. %.

As described further below, other alloying components may be present in the second steel alloy composition. Further, the alloy may comprise a cumulative amount of impurities and contaminants at less than or equal to about 0.1 wt. % of the total alloy composition, optionally less than or equal to about 0.05 wt. %, and in certain variations, less than or equal to about 0.01 wt. %.

The Fe makes up the balance of the first steel alloy.

In certain example embodiments, the second steel alloy further comprises nitrogen (N) at a concentration of greater than or equal to about 0 wt. % to less than or equal to about 0.008 wt. % or greater than or equal to about 0.0001 wt. % to less than or equal to about 0.008 wt. %. In some example embodiments, the second steel alloy is substantially free of N.

In certain example embodiments, the second steel alloy further comprises molybdenum (Mo) at a concentration of greater than or equal to about 0 wt. % to less than or equal to about 0.8 wt. %, greater than or equal to about 0.01 wt. % to less than or equal to about 0.8 wt. %, or less than or equal to about 0.8 wt. %. For example, in certain example embodiments, the second steel alloy is substantially free of Mo or comprises Mo at a concentration of less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, or less than or equal to about 0.1 wt. %, such as at a concentration of about 0.8 wt. %, about 0.7 wt. %, about 0.6 wt. %, about 0.5 wt. %, about 0.4 wt. %, about 0.3 wt. %, about 0.2 wt. %, about 0.1 wt. %, or lower. For example, in certain example embodiments, the second steel alloy is substantially free of Mo, for example, levels of less than or equal to about 0.0001 wt. % Mo or levels that are not detectable.

In certain example embodiments, the second steel alloy further comprises boron (B) at a concentration of greater than or equal to about 0 wt. % to less than or equal to about 0.005 wt. %, greater than or equal to about 0.0001 wt. % to less than or equal to about 0.005 wt. %, or less than or equal to about 0.005 wt. %. For example, in certain example embodiments, the second steel alloy is substantially free of B or comprises B at a concentration of less than or equal to about 0.005 wt. %, less than or equal to about 0.004 wt. %, less than or equal to about 0.003 wt. %, less than or equal to about 0.002 wt. %, or less than or equal to about 0.001 wt. %, such as at a concentration of about 0.005 wt. %, about 0.004 wt. %, about 0.003 wt. %, about 0.002 wt. %, about 0.001 wt. %, about 0.0005 wt. %, about 0.0001 wt. %, or lower. For example, in certain example embodiments, the second steel alloy is substantially free of B, for example, levels of less than or equal to about 0.0001 wt. % B or levels that are not detectable.

In certain example embodiments, the second steel alloy further comprises niobium (Nb) at a concentration of greater than or equal to about 0 wt. % to less than or equal to about 0.8 wt. %, greater than or equal to about 0.01 wt. % to less than or equal to about 0.8 wt. %, or less than or equal to about 0.8 wt. %. For example, in certain example embodiments, the second steel alloy is substantially free of Nb or comprises Nb, at a concentration of less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, or less than or equal to about 0.1 wt. %, such as at a concentration of about 0.8 wt. %, about 0.7 wt. %, about 0.6 wt. %, about 0.5 wt. %, about 0.4 wt. %, about 0.3 wt. %, about 0.2 wt. %, about 0.1 wt. %, or lower. For example, in certain example embodiments, the second steel alloy is substantially free of Nb, for example, levels of less than or equal to about 0.0001 wt. % Nb or levels that are not detectable.

In certain example embodiments, the second steel alloy further comprises vanadium (V) at a concentration of greater than or equal to about 0 wt. % to less than or equal to about 0.8 wt. %, greater than or equal to about 0.01 wt. % to less than or equal to about 0.8 wt. %, or less than or equal to about 0.8 wt. %. For example, in certain example embodiments, the second steel alloy is substantially free of V or comprises V at a concentration of less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, or less than or equal to about 0.1 wt. %, such as at a concentration of about 0.8 wt. %, about 0.7 wt. %, about 0.6 wt. %, about 0.5 wt. %, about 0.4 wt. %, about 0.3 wt. %, about 0.2 wt. %, about 0.1 wt. %, or lower. For example, in certain example embodiments, the second steel alloy is substantially free of V, for example, levels of less than or equal to about 0.0001 wt. % V or levels that are not detectable.

In certain example embodiments, the second steel alloy further comprises nickel (Ni) at a concentration of greater than or equal to about 0 wt. % to less than or equal to about 5 wt. %, greater than or equal to about 1 wt. % to less than or equal to about 3 wt. %, greater than or equal to about 1.5 wt. % to less than or equal to about 2.5 wt. %. In certain example embodiments, the second steel alloy is substantially free of Ni or comprises Ni at a concentration of less than or equal to about 5 wt. %, less than or equal to about 4.5 wt. %, less than or equal to about 4 wt. %, less than or equal to about 3.5 wt. %, less than or equal to about 3 wt. %, less than or equal to about 2.5 wt. %, or less than or equal to about 2 wt. %, less than or equal to about 1.5 wt. %, less than or equal to about 1 wt. %, less than or equal to about 0.5 wt. %, such as at a concentration of about 5 wt. %, about 4.8 wt. %, about 4.6 wt. %, about 4.4 wt. %, about 4.2 wt. %, about 4 wt. %, about 3.8 wt. %, about 3.6 wt. %, about 3.4 wt. %, about 3.2 wt. %, about 3 wt. %, about 2.8 wt. %, about 2.6 wt. %, about 2.4 wt. %, about 2.2 wt. %, about 2 wt. %, about 1.8 wt. %, about 1.6 wt. %, about 1.4 wt. %, about 1.2 wt. %, about 1 wt. %, about 0.8 wt. %, about 0.6 wt. %, or about 0.5 wt. %. For example, in certain example embodiments, the second steel alloy is substantially free of Ni, for example, levels of less than or equal to about 0.0001 wt. % Ni or levels that are not detectable.

The second steel alloy can include various combinations of C, Cr, Si, Mn, N, Ni, Mo, B, Nb, V, and Fe at their respective concentrations described above. In some embodiments, the second steel alloy consists essentially of C, Cr, Si, Mn, and Fe. As described above, the term "consists essentially of" means the steel alloy excludes additional compositions, materials, components, elements, and/or features that materially affect the basic and novel characteristics of the second steel alloy, such as second the steel alloy may not require coatings or descaling when formed into a press-hardened steel component, but any compositions, materials, components, elements, and/or features that do not materially affect the basic and novel characteristics of the steel alloy can be included in the embodiment. Therefore, when the second steel alloy consists essentially of C, Cr, Si, Mn, and Fe, the second steel alloy can also include any combination of N, Ni, Mo, B, Nb, and V, as provided above, that does not materially affect the basic and novel characteristics of the second steel alloy. In other embodiments, the second steel alloy consists of C, Cr, Si, Mn, and Fe at their respective concentrations described above and at least one of N, Ni, Mo, B, Nb, and V at their respective concentrations described above. Other elements that are not described herein can also be included in trace amounts, i.e., amounts of less than or equal to about 1.5 wt. %, less than or equal to about 1 wt. %, less than or equal to about 0.5 wt. %, or amounts that are not detectable, provided that they do not materially affect the basic and novel characteristics of the second steel alloy.

In some example embodiments, the second steel alloy consists essentially of C, Cr, Si, Mn, and Fe. In some example embodiments, the second steel alloy consists of C, Cr, Si, Mn, and Fe.

In some example embodiments, the second steel alloy consists essentially of C, Cr, Si, Mn, Ni, and Fe. In some example embodiments, the second steel alloy consists of C, Cr, Si, Mn, Ni, and Fe.

In some example embodiments, the second steel alloy consists essentially of C, Cr, Si, Mn, Mo, and Fe. In some example embodiments, the second steel alloy consists of C, Cr, Si, Mn, Mo, and Fe.

In some example embodiments, the second steel alloy consists essentially of C, Cr, Si, Mn, Mo, Ni, and Fe. In some example embodiments, the second steel alloy consists of C, Cr, Si, Mn, Mo, Ni, and Fe.

In some example embodiments, the second steel alloy consists essentially of C, Cr, Si, Mn, Mo, Nb, V, and Fe. In some example embodiments, the second steel alloy consists of C, Cr, Si, Mn, Mo, Nb, V, and Fe.

In some example embodiments, the second steel alloy consists essentially of C, Cr, Si, Mn, Mo, Nb, V, Ni, and Fe. In some example embodiments, the second steel alloy consists of C, Cr, Si, Mn, Mo, Nb, V, Ni, and Fe.

In some example embodiments, the second steel alloy consists essentially of C, Cr, Si, Mn, Mo, Nb, and Fe. In some example embodiments, the second steel alloy consists of C, Cr, Si, Mn, Mo, Nb, and Fe.

In some example embodiments, the second steel alloy consists essentially of C, Cr, Si, Mn, Mo, Nb, Ni, and Fe. In some example embodiments, the second steel alloy consists of C, Cr, Si, Mn, Mo, Nb, Ni, and Fe.

In some example embodiments, the second steel alloy consists essentially of C, Cr, Si, Mn, N, and Fe. In some example embodiments, the second steel alloy consists of C, Cr, Si, Mn, N, and Fe.

In some example embodiments, the second steel alloy consists essentially of C, Cr, Si, Mn, N, Ni, and Fe. In some example embodiments, the second steel alloy consists of C, Cr, Si, Mn, N, Ni, and Fe.

In some example embodiments, the second steel alloy consists essentially of C, Cr, Si, Mn, N, Mo, B, Nb, V, and Fe. In some example embodiments, the second steel alloy consists of C, Cr, Si, Mn, N, Mo, B, Nb, V, and Fe.

In some example embodiments, the second steel alloy consists essentially of C, Cr, Si, Mn, N, Mo, B, Nb, V, Ni, and Fe. In some example embodiments, the second steel alloy consists of C, Cr, Si, Mn, N, Mo, B, Nb, V, Ni, and Fe.

In some example embodiments, the second steel alloy consists essentially of C, Cr, Si, and Fe. In some example embodiments, the second steel alloy consists of C, Cr, Si, and Fe.

In some example embodiments, the second steel alloy consists essentially of C, Cr, Si, Ni, and Fe. In some example embodiments, the second steel alloy consists of C, Cr, Si, Ni, and Fe.

In some example embodiments, the second steel alloy consists essentially of C, Cr, Si, Mo, B, Nb, V, and Fe. In some example embodiments, the second steel alloy consists of C, Cr, Si, Mo, B, Nb, V, and Fe.

In some example embodiments, the second steel alloy consists essentially of C, Cr, Si, Mo, B, Nb, V, Ni, and Fe.

In some example embodiments, the second steel alloy consists of C, Cr, Si, Mo, B, Nb, V, Ni, and Fe.

Table 2 shows a composition of second steel alloy of an example embodiment.

TABLE 2

| | Chemical Composition (wt. %) | | | | |
|---|---|---|---|---|---|
| Composition | C | Mn | Cr | Si | Others | Fe |
| Range | 0.2–0.45 | 0-3 | 0.01–6 | 0.1–2.5 | N <0.008, Ni <5, Mo <0.8, B <0.005, Nb/V <0.8 | Balance |

Hardened steel (e.g., formed from the roll clad multilayered assembly and hot stamping process) made from the second steel alloy may have an ultimate tensile strength (UTS) of greater than or equal to about 1,800 MPa to less than or equal to about 2,200 MPa, greater than or equal to about 2,000 MPa to less than or equal to about 2,200 MPa, greater than or equal to about, 1,800 MPa to less than or equal to about 2,000 MPa, or about 2,000 MPa.

Also, the hardened steel (e.g., formed from the roll clad multilayered assembly and hot stamping process) made from the second steel alloy may have a VDA 238-100 bending angle at)(° of greater than or equal to about 40 to less than or equal to 50, such as a VDA 238-100 bending angle of about 40°, about 42°, about 44°, about 46°, about 48°, or about 50°, in the hardened condition.

Prior to processing, the second steel alloy may be in the form of a coil of the metal. As noted above, the second steel alloy may be free of any applied coating, or may have an applied coating. The applied coatings may include galvanic coatings, such as zinc-based coatings, or aluminum-silicon anti-oxidation coatings. In this form, the coil can be unrolled and cut into predetermined shapes or blanks.

Figure 3:
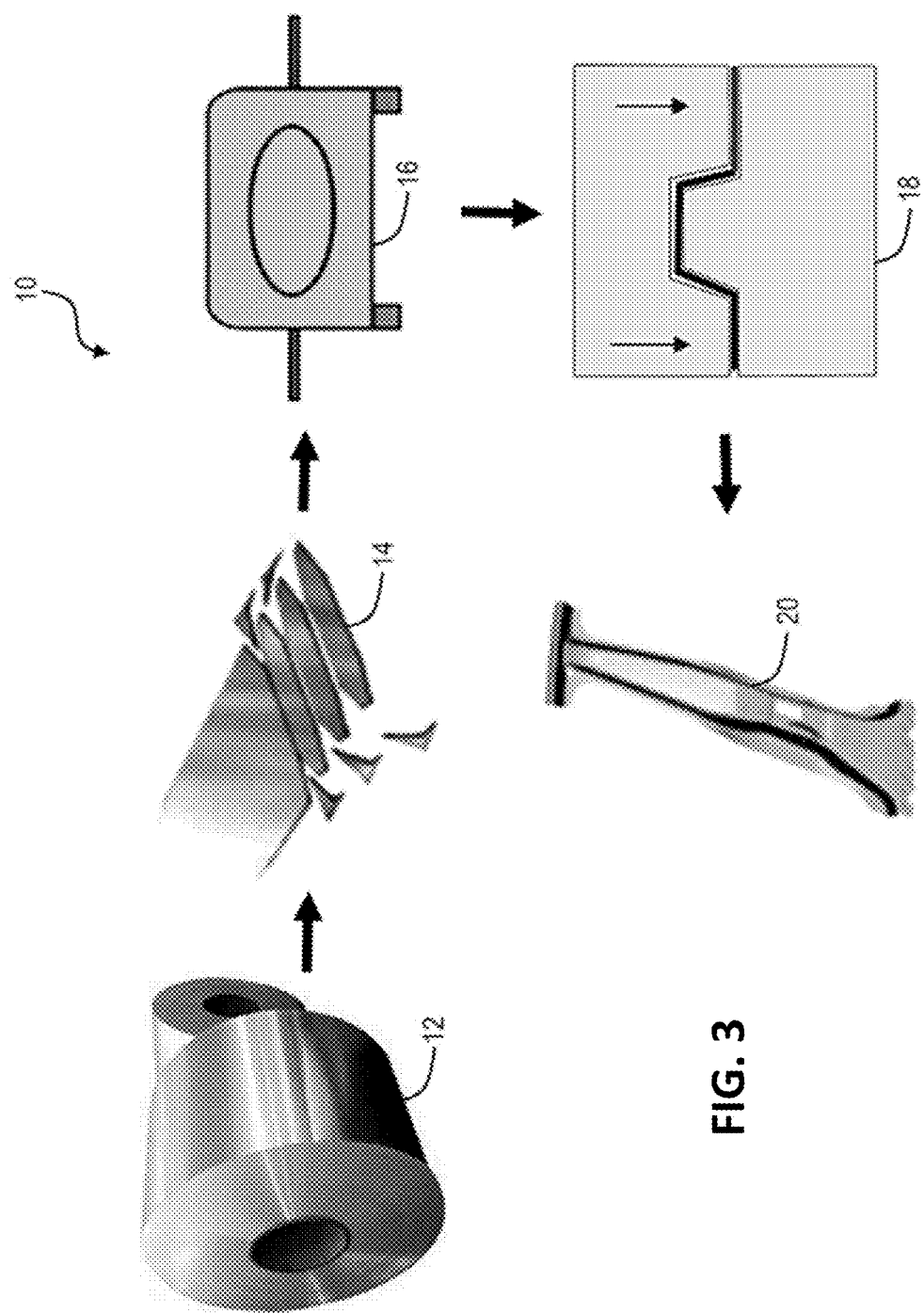
FIG. 3 is a flow diagram illustrating a method of making a steel assembly structure according to various aspects of the current technology.

With reference to FIG. 3, the current technology also provides a method 10 of fabricating a press-hardened steel component, which may be used in an automobile, by way of non-limiting example. More particularly, the method includes hot pressing the steel architectural component described above to form the press-hardened steel component. The steel architectural component is processed in either a coated form, e.g., coated with Al—Si or Zn (galvanized), or a bare form, e.g., without any coatings. Moreover, if the steel architectural component is bare, the method may be free from a descaling step, i.e., free from shot blasting, sand blasting, or any other method for preparing a smooth and homogenous surface. The press-hardened steel component can be any component that is generally made by hot stamping, such as, a vehicle part, for example. Non-limiting examples of vehicles that have parts suitable to be produced by the current method include bicycles, automobiles, motorcycles, boats, tractors, buses, mobile homes, campers, gliders, airplanes, and tanks. In certain example embodiments, the press-hardened steel component is an automobile part selected from the group consisting of a pillar, a bumper, a roof rail, a rocker rail, a rocker, a control arm, a beam, a tunnel, a beam, a step, a subframe member, and a reinforcement panel.

The method 10 comprises obtaining a coil 12 of a steel architectural component or multilayered assembly as described above according to the present technology and cutting a blank 14 from the coil 12. Although not shown, the blank 14 can alternatively be cut from a sheet of the steel architectural component. The method 10 also comprises hot pressing the blank 14. In this regard, the method 10 comprises austenitizing the blank 14 by heating the blank 14 in a furnace 16 to a temperature above its upper critical temperature (Ac3) temperature to fully austenitize the steel architectural component. The heated blank 14 is transferred to a die or press 18, optionally by a robotic arm (not shown). Here, the method 10 comprises stamping the blank 14 in the die or press 18 to form a structure having a predetermined shape and quenching the structure at a constant rate to a temperature less than or equal to about a martensite finish (Mf) temperature of the steel alloy and greater than or equal to about room temperature to form the press-hardened steel component. The quenching comprises decreasing the temperature of the structure at a constant rate of greater than or equal to about 10° C./s.

The method 10 as shown is free of a descaling step. As such, the method 10 does not include, for example, steps of shot blasting or sand blasting. Inasmuch as the steel alloy is bare, in certain variations, the press-hardened steel component does not include, for example, a layer of zinc (Zn) or an aluminum-silicon (Al—Si) coating. However, in certain variations, one or more of the sheets may have coatings. The method 10 may also be free of a secondary heat treatment after the quenching. One of ordinary skill in the art would recognize a shot blasting or sand blasting step may be beneficial when processing a coated or bare steel alloy and include such a step.

In various aspects of the current technology, the steel architectural component is in a form of a blank for hot stamping processes. The blank may be formed from any of the rolled sheets 100, 110, or 120 discussed above. Here, the blank forms a press hardening steel after hot stamping processes. Components within the alloy composition, such as, for example, boron and chromium, may lower a critical cooling rate in hot stamping processes relative to critical cooling rates employed without such components.

Figure 4:
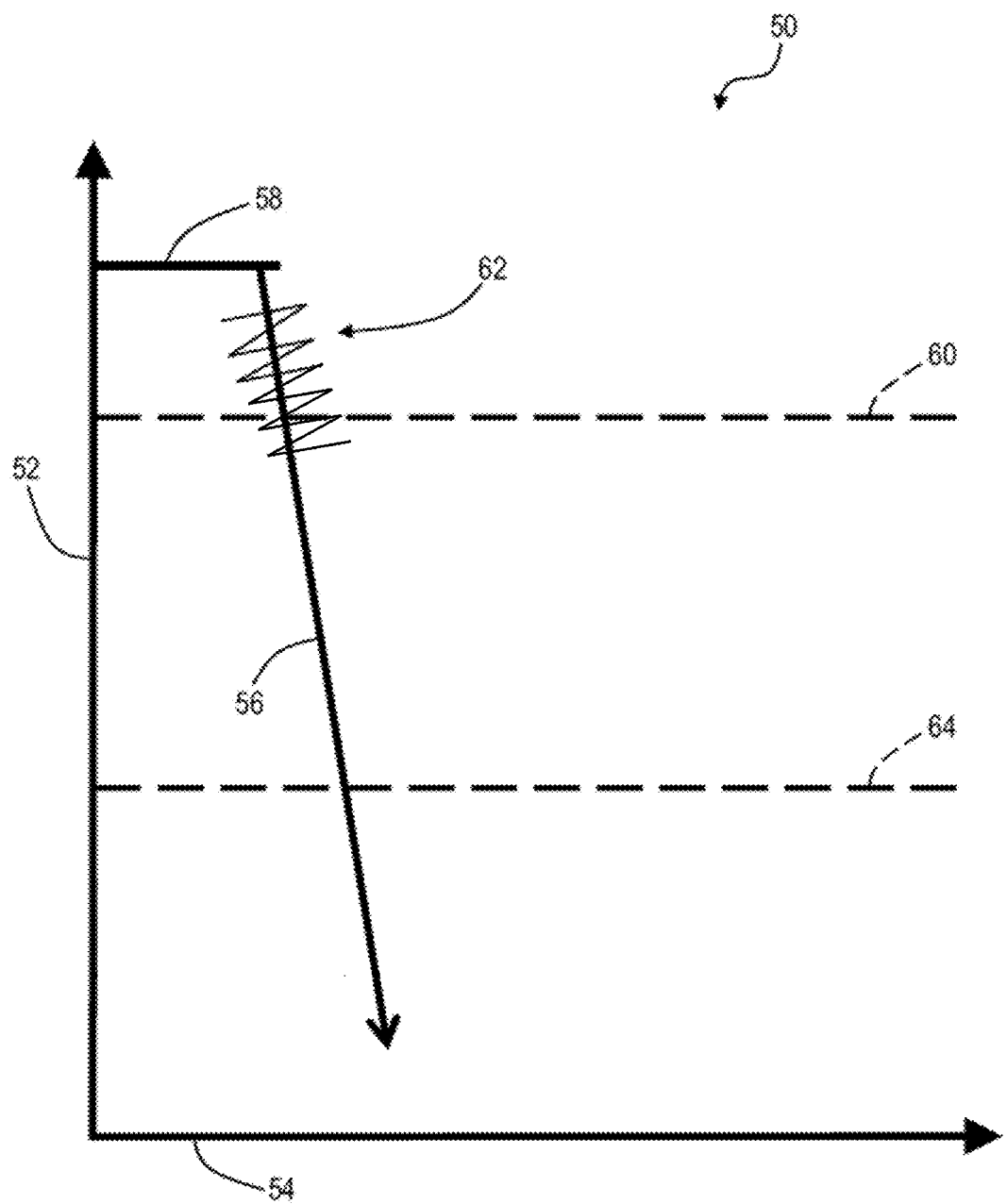
FIG. 4 is a graph showing temperature versus time for a hot pressing method used to process a steel alloy according to certain aspects of the current technology.

FIG. 4 shows a graph 50 that provides additional details about the hot pressing. The graph 50 has a y-axis 52 representing temperature and an x-axis 54 representing time. A line 56 on the graph 50 represents heating conditions during the hot pressing. Here, the blank is heated to a final temperature 58 that is above an upper critical temperature (Ac3) 60 of the steel alloy to fully austenitize the steel alloy. The final temperature 58 is greater than or equal to about 880° C. to less than or equal to about 950° C., in certain aspects, greater than or equal to about 900° C.

Without being bound by theory, adding high levels of Cr to the alloy composition, such as, for example, about 3% Cr by weight of the composition decreases the austenitization temperature. This may be seen in the following equation relating the composition according to example embodiments of a steel alloy and the Ac3 temperature of the alloy.

$$Ac3(° C.)=910-203*\% \ C1/2-30\% \ Mn+31.5*Mo-11*\% \ Cr+44.7*\% \ Si \leq 900° C. \quad \text{[Equation 1]}$$

The austenitized blank is then stamped or hot-formed into the structure having the predetermined shape at a stamping temperature 62 between the final temperature 58 and Ac3 60 and then cooled at a rate of greater than or equal to about 10° $Cs^{-1}$, greater than or equal to about 15° $Cs^{-1}$, or greater than or equal to about 20° $Cs^{-1}$, such as at a rate of about 10° $Cs^{-1}$, about 12° $Cs^{-1}$, about 14° $Cs^{-1}$, about 16° $Cs^{-1}$, about 18° $Cs^{-1}$, about 20° $Cs^{-1}$, or faster, until the temperature decreases below a martensite finish (Mf) temperature 64.

At such quench rates, the press-hardened steel alloy matrix of the resulting press-hardened structure of the first steel alloy may have a microstructure that is greater than or equal to about 90% martensite and bainite by volume (vol.

%), less than or equal to about 10% austenite by volume (vol. %), and less than or equal to about 10% ferrite by volume (vol. %).

In some example embodiments, the quenching is performed is performed traditionally by cooling the shaped object at a rate described above until the stamped object reaches a temperature below a Martensite finished (Mf) temperature of the alloy composition. The resulting microstructure of the press-hardened steel alloy matrix of the first alloy may be greater than or equal to about 90 volume % martensite and bainite. The remaining microstructure may be comprised of austenite, ferrite, or a combination thereof. The microstructure may comprise less than or equal to 10 vol. % of austenite, ferrite, or combinations thereof, provided the microstructure comprises greater than or equal to about 90 vol. % martensite and bainite, for example 95% vol. % martensite and bainite. Notably, in certain aspects, a portion of martensite may be substituted by bainite.

At such quench rates, the press-hardened steel alloy matrix of the resulting press-hardened structure of the second steel alloy may have a microstructure that is greater than or equal to about 90% martensite by volume (vol. %), less than or equal to about 10% volume (vol. %) of other phases, such as austenite and ferrite.

In some example embodiments, the quenching is performed traditionally by cooling the shaped object at a rate described above until the stamped object reaches a temperature below a Martensite finished (Mf) temperature of the alloy composition. The resulting microstructure of the press-hardened steel alloy matrix of the second alloy may be greater than or equal to about 90 volume % martensite. The remaining microstructure may be comprised of austenite, ferrite, or a combination thereof. The microstructure may comprise less than or equal to 10 volume % of other phases, such as austenite, ferrite, or a combination thereof, provided the microstructure comprises greater than or equal to about 90 vol. % martensite, for example 95% vol. % martensite.

In certain example embodiments, the hot pressing, i.e., the heating, stamping, and quenching, may be performed in an aerobic atmosphere. The aerobic atmosphere provides oxygen that forms the oxides in the surface layers. Therefore, to control oxide formations, or to avoid such formation, the hot pressing can be performed in an anaerobic atmosphere, such as by supplying an inert gas into at least one of the oven or the die. The inert gas can be any inert gas known in the art, such as nitrogen or argon, as non-limiting examples. The quench rate and the final temperature can also be adjusted in order to influence the presence or size of oxide layers.

Hardened steel made from the steel architectural component (e.g., formed from the roll clad multilayered assembly and hot stamping process) may have an ultimate tensile strength (UTS) of greater than or equal to about 1,600 MPa to less than or equal to about 2,000 MPa, greater than or equal to about 1,800 MPa to less than or equal to about 2,000 MPa, greater than or equal to about, 1,600 MPa to less than or equal to about 2,000 MPa, or about 2,000 MPa.

Also, the hardened steel made from the steel architectural component (e.g., formed from the roll clad multilayered assembly and hot stamping process) may have a VDA bending angle $\alpha_t$ (°) of greater than or equal to about 50° to less than or equal to 80°, such as a VDA bending angle of about 50°, about 52°, about 54°, about 56°, about 58°, about 60°, about 62°, about 64°, about 66°, about 68°, about 70°, about 72°, about 74°, about 76°, about 78°, or about 80°, in the hardened condition.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A press-hardened steel assembly after hot stamping/hot forming comprising:
  a core layer comprising a first steel sheet having an ultimate tensile strength of greater than or equal to about 1,800 megapascals to less than or equal to about 2,200 megapascals and greater than or equal to 90 volume % martensite, the core layer having a first thickness of greater than or equal to about 40% of a total thickness of the press-hardened steel to less than or equal to about 96% of the thickness of the press-hardened steel assembly; and
  a first surface layer disposed along a first surface of the core, wherein the first surface layer comprises a second steel sheet having an ultimate tensile strength of greater than or equal to about 800 megapascals to less than or equal to about 1,200 megapascals and greater than or equal to 90 volume % martensite and bainite, wherein the press-hardened steel assembly has an ultimate tensile strength of greater than or equal to about 1,600 megapascals to less than or equal to about 2,000 megapascals and a VDA 238-100 bending angle of greater than or equal to about 50° to less than or equal to about 80°.

2. The press-hardened steel assembly of claim 1, wherein the first surface layer has a second thickness that is greater than or equal to about 2% of the total thickness of the press-hardened steel assembly to less than or equal to about 60% of the total thickness of the press-hardened steel assembly.

3. The press-hardened steel assembly of claim 2, further comprising a second surface layer disposed along a second surface of the core opposite to the first surface, wherein the second surface layer comprises a third steel sheet having an ultimate tensile strength of greater than or equal to about 800 megapascals to less than or equal to about 1,200 megapascals and greater than or equal to 90 volume % martensite and bainite.

4. The press-hardened steel assembly of claim 3, wherein the first surface layer has a second thickness that is greater than or equal to about 2% of the total thickness of the press-hardened steel assembly to less than or equal to about 30% of the total thickness of the press-hardened steel assembly and the second surface layer has a third thickness that is greater than or equal to about 2% of the total thickness of the press-hardened steel assembly to less than or equal to about 30% of the total thickness of the press-hardened steel assembly.

5. The press-hardened steel assembly of claim 1, wherein the first steel sheet has a VDA 238-100 bending angle of greater than or equal to about 70° to less than or equal to about 80° and the second steel sheet has a VDA 238-100 bending angle of less than or equal to about 45°.

6. The press-hardened steel assembly of claim 1, wherein the first steel sheet comprises less than or equal to about 10 vol. % of one or more phases selected from the group consisting of: austenite, ferrite, and combinations thereof; and the second steel sheet comprises less than or equal to about 10 vol. % of one or more phases selected from the group consisting of: austenite, ferrite, and combinations thereof.

7. The press-hardened steel assembly of claim 1, wherein the press-hardened steel is an architectural steel formed by a roll bonding process or a cladding process.

8. The press-hardened steel assembly of claim 1, wherein at least one of first steel sheet and the second steel sheet comprises a coating comprising zinc (Zn), aluminum (Al), silicon (Si), and combinations thereof.

9. The press-hardened steel assembly of claim 1, wherein the press-hardened steel assembly is free of any applied surface coatings.

10. A press-hardened steel assembly after hot stamping/hot forming comprising:
a core layer comprising a first steel sheet having an ultimate tensile strength of greater than or equal to about 1,800 megapascals to less than or equal to about 2,200 megapascals and greater than or equal to 90 volume % martensite, the core layer having a first thickness of greater than or equal to about 40% of a total thickness of the press-hardened steel to less than or equal to about 96% of the thickness of the press-hardened steel assembly; and
a first surface layer disposed along a first surface of the core, wherein the first surface layer comprises a second steel sheet having an ultimate tensile strength of greater than or equal to about 800 megapascals (MPa) to less than or equal to about 1,200 megapascals and greater than or equal to 90 volume % martensite and bainite, the first surface layer being greater than or equal to about 2% of a thickness of the press-hardened steel to less than or equal to about 60% of the thickness of the press-hardened steel, wherein
the first steel sheet comprises an alloy composition comprising:
carbon (C) at a concentration of greater than or equal to about 0.01 wt. % to less than or equal to about 0.2 wt. %,
chromium (Cr) at a concentration of greater than or equal to about 0.01 wt. % to less than or equal to about 6 wt. %,
manganese (Mn) at a concentration of greater than or equal to about 0.5 wt. % to less than or equal to about 4.5 wt. %,
silicon (Si) at a concentration of greater than or equal to about 0.1 wt. % to less than or equal to about 2.5 wt. %, and
a balance of the alloy composition being iron (Fe), and
an alloy composition of the second steel sheet comprising
carbon (C) at a concentration of greater than or equal to about 0.2 wt. % to less than or equal to about 0.45 wt. %,
chromium (Cr) at a concentration of greater than or equal to about 0.01 wt. % to less than or equal to about 6 wt. %,
manganese (Mn) at a concentration of greater than or equal to about 0 wt. % to less than or equal to about 3 wt. %,
silicon (Si) at a concentration of greater than or equal to about 0.1 wt. % to less than or equal to about 2.5 wt. %, and
a balance of the alloy composition being iron (Fe), wherein the press-hardened steel assembly has an ultimate tensile strength of greater than or equal to about 1,600 megapascals to less than or equal to about 2,000 megapascals and a VDA 238-100 bending angle of greater than or equal to about 50° to less than or equal to about 80°.

11. The press-hardened steel assembly of claim 10, further comprising a second surface layer, the second surface layer including a third steel sheet having an ultimate tensile strength of greater than or equal to about 800 megapascals to less than or equal to about 1,200 megapascals and greater than or equal to 90 volume % martensite and bainite;
wherein a second thickness of the first surface layer and a third thickness of the second surface layer each being independently greater than or equal to about 2% of the thickness of the press-hardened steel to less than or equal to about 30% of the thickness of the press-hardened steel assembly.

12. The press-hardened steel assembly of claim 10, wherein the first steel sheet comprises less than or equal to about 10 vol. % of one or more phases selected from the group consisting of: austenite, ferrite, and combinations thereof; and
the second steel sheet comprises less than or equal to about 10 vol. % of one or more phases selected from the group consisting of: austenite, ferrite, and combinations thereof.

13. The press-hardened steel assembly of claim 10, wherein at least one of first steel sheet and the second steel sheet comprises a coating comprising zinc (Zn), aluminum (Al), silicon (Si), and combinations thereof.

14. The press-hardened steel assembly of claim 10, wherein the press-hardened steel assembly is free of any applied surface coatings.

15. A method of forming a press-hardened steel component, the method comprising:
selecting a blank of a steel alloy, the steel alloy being an architectural steel assembly comprising:
a first surface layer, the first surface layer including a first steel sheet;
a core layer, the core layer including a second steel sheet; and
a second surface layer, the second surface layer including another first steel sheet;
stamping the heated blank into a predetermined shape to form a stamped component; and
quenching the stamped component at a constant rate to a temperature less than or equal to about a martensite finish (Mf) temperature of the steel alloy and greater than or equal to about room temperature to form
the press-hardened steel component having a tensile strength of greater than or equal to about 1,600 megapascals to less than or equal to about 2,000 megapascals and a VDA 238-100 bending angle of greater than or equal to about 50° to less than or equal to about 80°,
the first steel sheet having a strength of greater than or equal to 800 megapascals to less than or equal to 1200 megapascals, the first surface layer being greater than or equal to 2% of a thickness of the blank to less than or equal to 30% of the thickness of the stamped component,
the second steel sheet having a strength of greater than or equal to 1800 megapascals to less than or equal to 2200 megapascals, the core layer being greater than or equal to 40% of the thickness of the blank to less than or equal to 96% of the thickness of the stamped component, and the second surface layer being greater than or equal to 2% of the thickness of the blank to less than or equal to 30% of the thickness of the stamped component.

16. The method of claim 15, wherein the method does not include a descaling step, and the architectural steel does not include a layer of zinc (Zn) or an aluminum-silicon (Al—Si) coating.

17. The method of claim 15, wherein the method further comprises a descaling step, and the architectural steel includes a layer of zinc (Zn) or an aluminum-silicon (Al—Si) coating.

18. The method of claim 15, wherein the press-hardened steel is an architectural steel formed by a roll bonding process, the roll bonding process including
- passing the first and second surface, and core layers through rollers under sufficient pressure to bond the layers, and
- welding the edges of the first and second surface, and core layers together.

19. The method according to claim 15, wherein the quenching comprises decreasing the temperature of the stamped object at a rate of greater than or equal to about 15° C./s until the stamped object reaches a temperature below a martensite finish (Mf) temperature of the steel alloy.

* * * * *